(12) United States Patent
Lakshminarayan et al.

(10) Patent No.: US 8,620,987 B2
(45) Date of Patent: Dec. 31, 2013

(54) MULTI-REGIME DETECTION IN STREAMING DATA

(75) Inventors: Choudur Lakshminarayan, Austin, TX (US); Alexander Singh Alvarado, Gainesville, FL (US); Evan Kriminger, Gainesville, FL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 109 days.

(21) Appl. No.: 13/229,710

(22) Filed: Sep. 10, 2011

(65) Prior Publication Data

US 2013/0067106 A1    Mar. 14, 2013

(51) Int. Cl.
*G06F 15/16*    (2006.01)

(52) U.S. Cl.
USPC .......................................................... 709/200

(58) Field of Classification Search
USPC ................... 709/200–202, 224, 231; 702/179
See application file for complete search history.

(56) References Cited

U.S. PATENT DOCUMENTS

| | | | |
|---|---|---|---|
| 6,889,691 B2 * | 5/2005 | Eklund et al. ............ | 128/204.21 |
| 7,525,102 B1 * | 4/2009 | Henshaw et al. ............ | 250/393 |
| 8,014,585 B2 * | 9/2011 | Kinjo ............................ | 382/141 |
| 8,204,107 B2 * | 6/2012 | Zhuang et al. ................ | 375/240 |

* cited by examiner

*Primary Examiner* — Moustafa M Meky (57) ABSTRACT

Systems and methods for multi-regime detection in streaming data are disclosed. An example method includes generating vectors for each sample of the streaming data. The method also includes inducing mean independence of the vectors to find an embedded data trajectory. The method also includes comparing the embedded data trajectory with known data trajectories. The method also includes issuing an alert if the embedded data trajectory corresponds to a known data trajectory indicating an anomaly in the streaming data.

20 Claims, 7 Drawing Sheets

MULTI-REGIME DETECTION IN STREAMING DATA

BACKGROUND

Sensors are commonly used to collect data in real-time. This data is also referred to as time series data, streaming data, and/or data streams, and represents a substantially continuous flow of data. For example, modern industrial facilities often have multiple sensors to gather a wide variety of data types for monitoring the state or condition of various operations at the facility. The streaming data may be analyzed to detect "events" and thus warn of impending failures.

By way of illustration, the oil and gas industry often equips oil and gas wells with thousands of sensors and gauges to measure flow rates, pressure, and temperature, among other parameters. Any variations in flow rate, pressure and/or temperature may indicate an issue that needs to be addressed in order to avoid a partial or even complete shutdown of the oil well, which can lead to lost productivity and lower profit margins.

But data collected from these sensors can be "noisy," the data often does not have a constant amplitude, and the data can be plagued by shifts in the mean. These aspects of the data make it difficult to accurately model the data stream and extract relevant events. In addition, quickly detecting changes can be difficult in a real-time or "online" environment, due to the reliance on intensive mathematical analysis which can take significant time to compute. In addition, frequency domain approaches often use a window of data to estimate spectral features. But waiting to gather enough data to populate a window to analyze can result in delays detecting events. Other techniques extract time domain features from the time series and make decisions based on statistical models. But these models often have to be manually "hand-crafted" based on the type of data stream, and thus can fail if the type of data stream changes.

DETAILED DESCRIPTION

Detecting different regimes in streaming data can be used to issue an alert in advance of an event so that corrective action can be taken before the event leads to a disruption. While analyzing the streaming data on the macro-level (e.g., flow rate), there are a number of underlying factors within a typical data stream which can be detected even earlier. For example, there are a number of underlying factors that can induce tremendous variability in the data stream and can be detected before producing varying flow regimes. These factors may include, but are not limited to, fluid composition, oil viscosity, compressibility, and specific gravity. Any change in these factors may produce a change in flow regime and thus may indicate a potential problem with the oil well. Of course, data streams are not limited to the oil and gas industry and the techniques described herein have application in a wide variety of fields.

The systems and methods described herein enable multi-regime detection in streaming data. In an example, the time series is represented in the phase space using a modified embedding technique, which is invariant to translation and scale. The embedding function is referred to herein as a "modified embedding" because the representation is not an embedding in the strict mathematical sense. Incoming trajectory segments from the data stream are compared to an embedded training set in a modified embedding space. The comparison is made in the sense of a similarity measure that compares points in the trajectory at corresponding times. The comparison may use cross-correntropy, which can be thought of as a generalized correlation function. Cross-correntropy enables the time structure of trajectories which sit on a sphere in the modified embedding space to be fully exploited, resulting in shorter detector reaction times.

Accordingly, the systems and methods disclosed herein can be used in online, multi-regime, and/or non-stationary environments for fast and early detection of changes in regime. The embedding function provides translation invariance and scale invariance. The techniques can also be applied to non-linear oscillations.

Before continuing, it is noted that as used herein, the terms "includes" and "including" mean, but is not limited to, "includes" or "including" and "includes at least" or "including at least." The term "based on" means "based on" and "based at least in part on."

Figure 1:
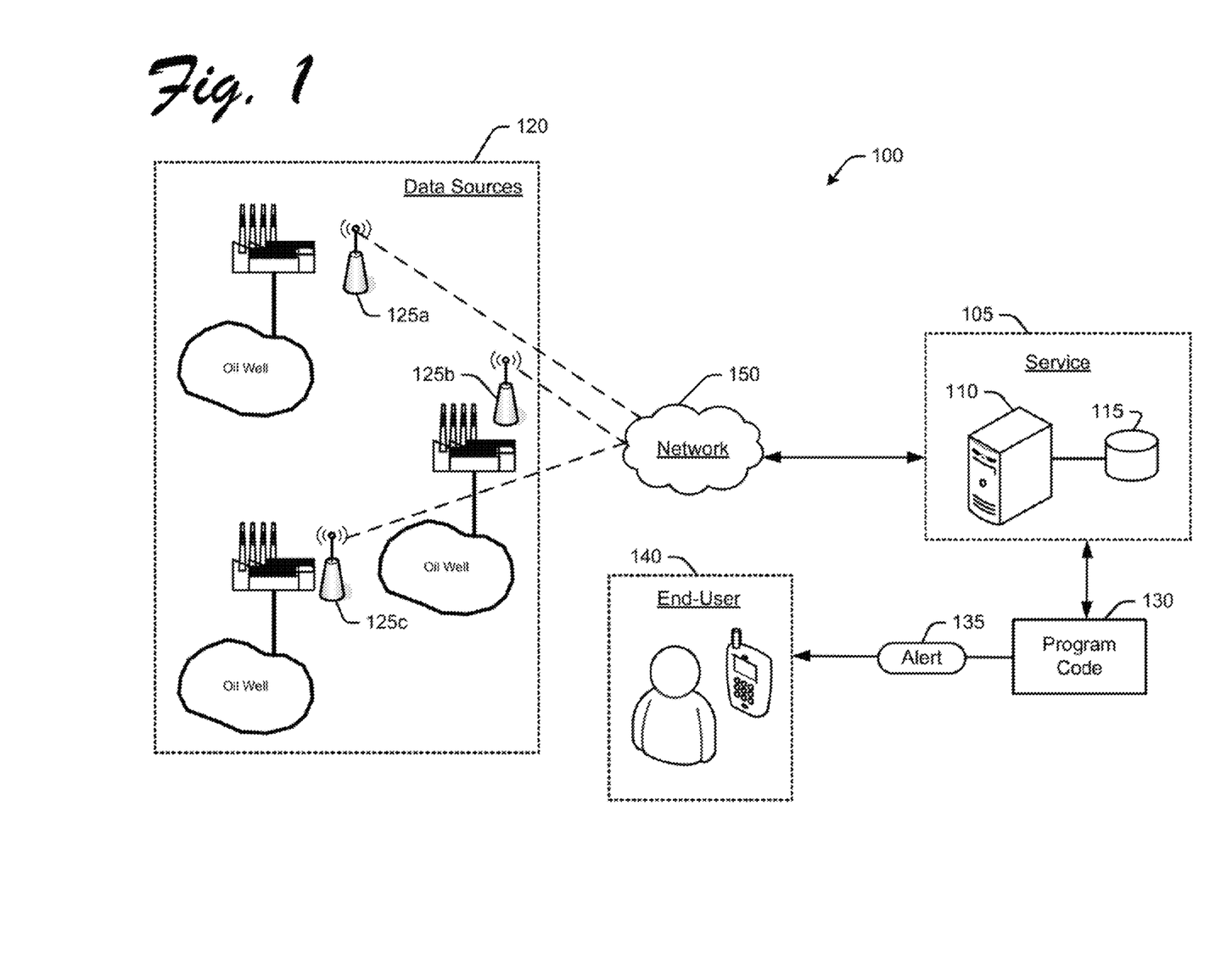
FIG. 1 is a high-level illustration of an example networked computer system which may be implemented for multi-regime detection in streaming data.

FIG. 1 is a high-level block diagram of an example networked computer system 100 which may be implemented for multi-regime detection in streaming data. System 100 may be implemented with any of a wide variety of computing devices 110, such as, but not limited to, server computers, blade servers, and appliances (e.g., devices dedicated to providing a computing service), to name only a few examples. Each of the computing devices may include memory, storage, and a degree of data processing capability at least sufficient to manage a communications connection either directly with one another or indirectly (e.g., via a network). At least one of the computing devices is also configured with sufficient processing capability to execute program code for carrying out the operations described herein.

In an example, the computing device 110 may receive streaming data from one or more source 120, such as sensors 125a-c. For purposes of illustration, the sensors shown in FIG. 1 are used to gather flow rate data from oil well(s). However, it is noted that data streams are not limited to use in the oil and gas industry, and can include other sources. Other sources of streaming data may include weather data, vehicle traffic, network traffic for a data center, electricity for a smart grid, water measurements for a treatment facility, and even vitality data for a person or biological system, to name only a few examples of streaming data.

There is no limit to the type or amount of data that may be provided by a source. In addition, the content may include unprocessed or "raw" data, or the content may undergo at least some level of processing. For example, data may be filtered prior to executing the operations described herein to reduce noise injected into the data stream which is not representative of actual data from the sensor(s).

The data stream may be accessed for online data processing by a computing device 110 configured as a server computer with computer-readable storage 115. Program code 130 executing on the computing device 110 may analyze the streaming data and issue alerts, e.g., indicative of a change in regime in the data stream. Program code 130 may also include interfaces to application programming interfaces (APIs) and related support infrastructure, including hosted monitoring services 105 which can be used to provide the alerts 135 to a facility operator or other customer based on the change in regime so that additional monitoring and/or corrective action can be taken in a timely manner.

Although, it is noted that the operations described herein may be executed by program code 130 residing on a server device, other computing devices may also be implemented. Other computing devices may include, but are not limited to a personal computer, a tablet or other mobile device. In an example, mobile devices used on-site by an end-user 140 such as a facility operator may be implemented in conjunction with a "back-end" computer system having more processing capability, such as the server computer 110, or a plurality of server components in a data center or "cloud computing" environment.

The system 100 may also include a communication network 150, such as a local area network (LAN) and/or wide area network (WAN). In one example, the network 150 includes the Internet or other mobile communications network (e.g., a 3G or 4G mobile device network). Network 150 may also provide greater accessibility for use in distributed environments, for example, where more than one source is providing the streaming data. The various sensor(s) and computing device(s) may be provided on the network 150 via a communication connection, such as via an Internet service provider (ISP). In this regard, access may be provided directly via the network 150, or via an agent, such as another network. Such an implementation may be particularly desirable where an operator is responsible for monitoring multiple, geographically distributed production sites, for example, in the oil and gas or other industries.

As mentioned above, the program code 130 may be executed by any suitable computing device to analyze data stream. In addition, the program code may analyze one or more than one data stream. The operations described herein are not limited to any specific implementation with any particular type of program code. In an example, the program code may be implemented in machine-readable instructions (such as but not limited to, software or firmware). The machine-readable instructions may be stored on a non-transient computer readable medium and are executable by one or more processor to perform the operations described herein. It is noted, however, that the components shown herein are provided only for purposes of illustration of an example operating environment, and are not intended to limit implementation to any particular system.

The program code executes the function of the architecture of machine readable instructions as self-contained modules. These modules can be integrated within a self-standing tool, or may be implemented as agents that run on top of an existing program code. Operations performed by executing the program code can be understood with reference to FIG. 2.

Figure 2:
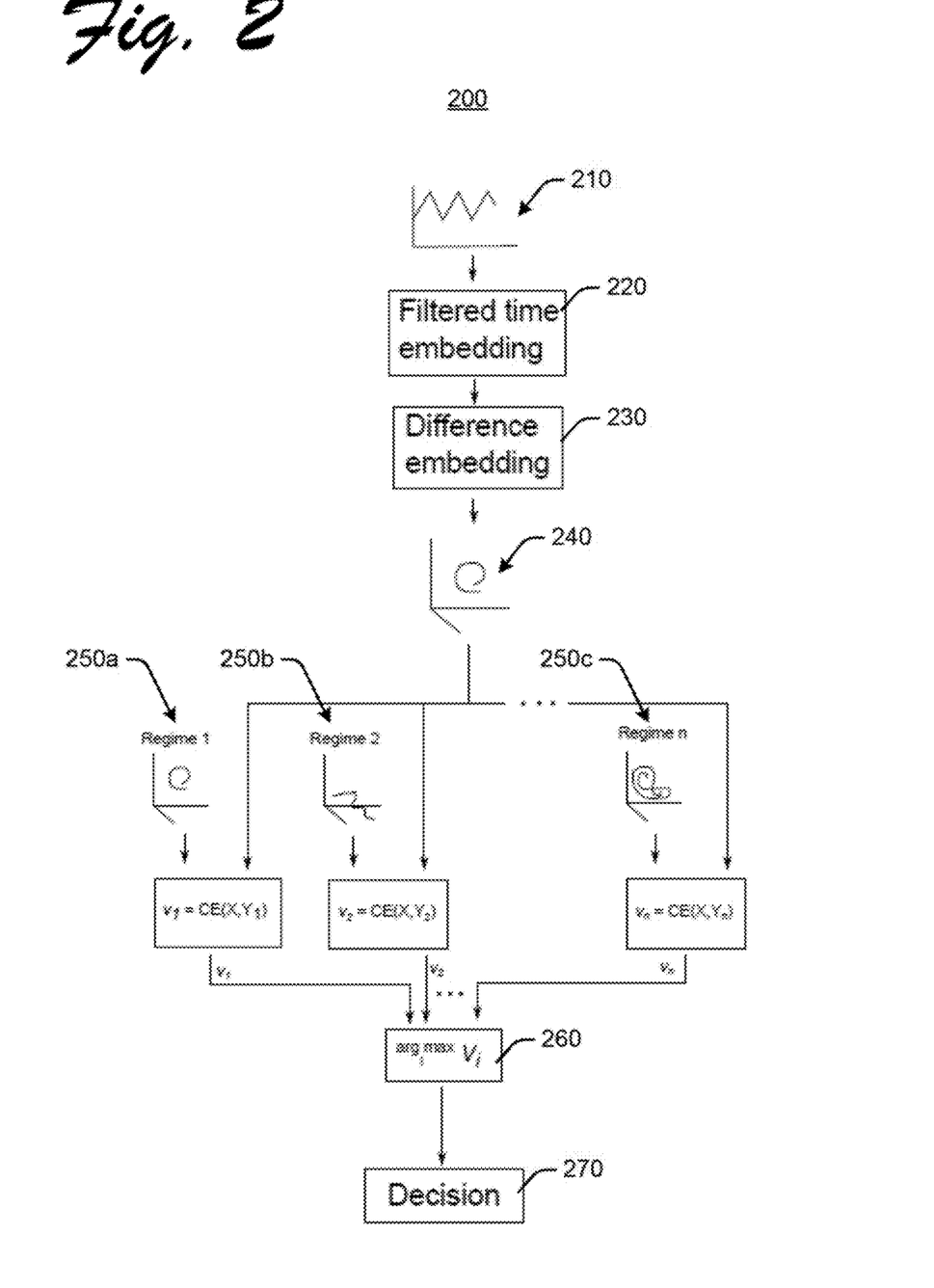
FIG. 2 is an overview diagram illustrating multiple regime detection in a modified reconstructed phase space with a cross-correntropy similarity measure.

FIG. 2 is an overview diagram 200 illustrating multiple regime detection in a modified reconstructed phase space with a cross-correntropy similarity measure. Streaming data 210 is shown as it may be received from a source. For example, the streaming data 210 may include both macro and micro data related to flow rate for an oil or gas well. A change in regime for any of this data may be indicative of a potential or pending issue that should be addressed.

For each data stream sample, a vector is created 220 with elements that are linear combinations of time delayed samples. The last vector element is subtracted 230 from the other vector elements to induce mean independence. The result is an embedded data trajectory (X) 240. The embedded data trajectory (X) 240 is compared with data trajectories representing various regimes of interest 250a-c, generated using a training set.

Each regime (i) has an associated embedded training set $(Y_i)$, where CE is the sample cross-correntropy between arguments. The regime with the largest cross-correntropy between the streaming data trajectory (X) and the embedded regime training set $(Y_i)$ is selected at 260. It can be seen by visual inspection that the example embedded data trajectory 240 shown in FIG. 2 is a closest fit with the known data trajectory 250a.

Once the data trajectory is found, a decision is made 270 whether to issue an alert. For purposes of illustration, the data trajectory 250a for Regime 1 may represent normal or expected flow regimes, and Regime 2 through Regime n indicate various types of potential problems that warrants further monitoring or closer inspection. In the example above, where the streaming data 210 was found to correspond to Regime 1, then no alert needs to be issued because Regime 1 is considered normal or expected flow regimes. But if analysis indicates that streaming data 210 has changed to one of the other Regimes 2-n, then an alert may be issued based on the particular regime.

Figure 3:
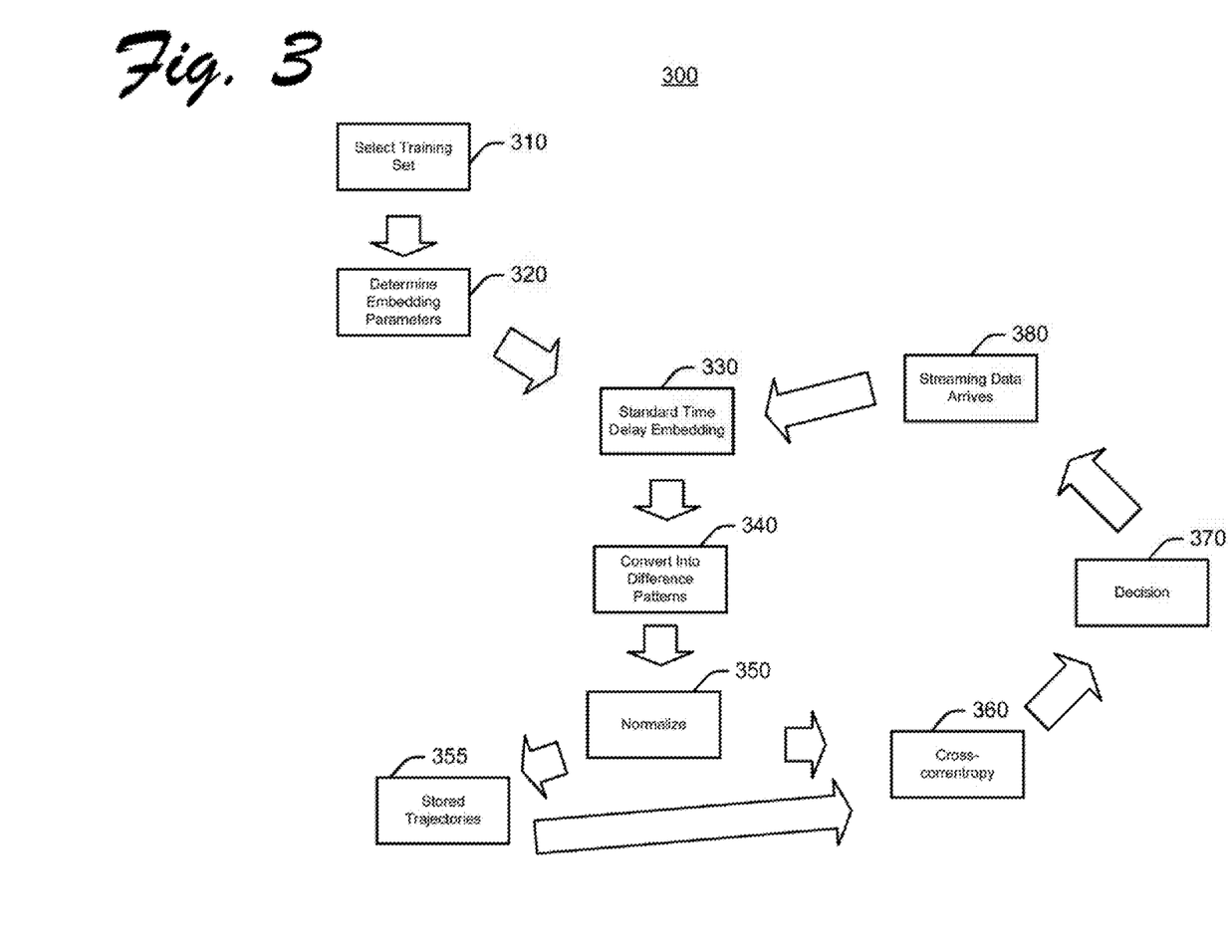
FIG. 3 is a processing diagram illustrating online regime detection in a modified embedding space with cross-correntropy.

Having generally described the operating environment and execution of example program code, attention is now drawn to FIG. 3 for a more detailed explanation of processing which may be implemented by the program code during execution of the modified embedding for multi-regime detection in non-stationary, streaming data.

FIG. 3 is a processing diagram 300 illustrating online regime detection in a modified embedding space with cross-correntropy. A training set 310 is selected, and then embedding parameters 320 are determined. An embedding is a map from an m-dimensional manifold to a (2 m+1)-dimensional Euclidean space, where every point on the original manifold has a unique image in the higher dimensional space. Takens Embedding Theorem provides a means of reconstructing the phase space of a multi-dimensional dynamical system from the time delays of a single series of measurements. Consider a discrete time series with x being the value at time n. Then, at each time n, we can build a vector:

$$x^{(n)} = [x_n, x_{n-\tau}, \ldots, x_{n-2m\tau}]$$

In the above equation, m is the embedding dimension and $\tau$ is the time delay. The limit set of the trajectories (the attractor) is embedded in the manifold created by the $x^{(n)}$ values.

The time delay may be determined by finding the first time lag that produces a local minima in a dependence measure between x and $x_{n-\tau}$, such as autocorrelation or mutual information. The selection of $\tau$ is flexible and chosen such that the components of $x^{(n)}$ values are not correlated. After the time-delay, $\tau$ is fixed, and the embedding dimension m is estimated by algorithms such as GrassbergerProcaccia, which approximates the correlation dimension. Time delay embedding 330 (FIG. 3) preserves dynamical invariants such as entropy, dimensional, and Lyapunov exponents, which are used to analyze the underlying physical system.

In the case of regime detection, the properties of the system are of less concern than changes in the reconstructed trajectories produced by noise, amplitude scaling, and shifting means in the input streaming data. The data can be normalized, but if the data is time varying, these normalizations are implemented online in the test set. Instead of these preprocessing approaches (that are normally ad-hoc), the systems and methods described include invariance to these aspects directly in the embedding framework, with the advantage of fast online operation and also of a sound mathematical foundation. The program code operates with a modified embedding space in which the points x and ax+b are indistinguishable, where a is a scaling factor, and b is the translation.

Symbolic dynamics are used to provide accurate representations of reconstructed attractors. In particular, encoding time delay embedding vectors 330 (FIG. 3) into symbols based on order patterns provides translation invariance. In an m-dimensional space, each point maps to one of m! order patterns. In applications, information loss is substantial due to this encoding. For example, the Lorenz attractor which unfolds in 3-dimensions, has only 6-order patterns. A variant of the order patterns may be used instead, referred to herein as "difference patterns" 340 (FIG. 3). A difference pattern, $\Delta x(n)$, at time n, is given by:

$$\Delta x^{(n)} = [x_n - x_{n-2m\tau}, \ldots, x_{n-(2m-1)\tau} - x_{n-2m\tau}]$$

In the above equation, every component of x(n) is subtracted by the last component. The last component of $\Delta x(n)$ is always zero, and so it can be removed. Therefore, the original (2m+1)-dimensional point in the reconstructed phase space is mapped to a 2m-dimensional space. This is analogous to establishing a quantitative order pattern with the $x_{n-2m\tau}$ component as a zero reference point. The translation invariance in the space of order patterns can be found by letting $y_n = x_n - b$, be a translated time series, as follows:

$$\Delta y^{(n)} = [y_n - y_{n-2m\tau}, \ldots, y_{n-(2m-1)\tau} - y_{n-2m\tau}]$$
$$= [(x_n - b) - (x_{n-2m\tau} - b), \ldots]$$
$$= [x_n - x_{n-2m\tau}, \ldots]$$
$$= \Delta x^{(n)}$$

Translating the time series does not alter the difference pattern, similarly to the differencing operation applied to non-stationary time series. However, this representation is no longer an embedding because it is not invertible.

To achieve scale invariance, the $\Delta x(n)$ vectors are normalized 350 (FIG. 3) by their Euclidean norms to yield:

$$\Delta \hat{x}^{(n)} = \frac{\Delta x^{(n)}}{\|\Delta x^{(n)}\|}$$

These new vectors are the projections of the $\Delta x(n)$ onto the unit sphere in 2m-dimensional space. Consider a translated and scaled time series $y_n = ax_n - b$. First, the difference pattern 340 is created as follows:

$$\Delta y^{(n)} = [ax_n - ax_{n-2m\tau}, \ldots]$$
$$= a\Delta x^{(n)}$$

Translation invariance still holds, but the scaling factors out of the difference pattern and "disappears" when normalized 350, as follows:

$$\Delta \hat{y}^{(n)} = \frac{\Delta y^{(n)}}{\|\Delta y^{(n)}\|}$$
$$= \frac{a \Delta x^{(n)}}{a \|\Delta x^{(n)}\|}$$
$$= \Delta \hat{x}^{(n)}$$

The trajectories in the modified embedding space are on the surface of a sphere. The Eucidean distance can be replaced with the geodesic length on the sphere, to obtain a better depiction of the distance between points. All modified embedding space points are unit vectors, so the dot product between two points is the cosine of the angle between them. The geodesic length is therefore the arc cosine of the dot product.

Effectively, this operation projects the trajectories onto the unit sphere and loses some of the distance information that was present in the difference pattern attractor. In particular, all points on a line extending from the origin map to the same point on the sphere. The modified embedding is, however, a useful depiction of the time evolution of the system. The regime detection used here takes advantage of the time structure of the trajectories, rather than using static distance information.

Consider discrete random processes $\{X_{n_1}: n_1 \in N_1\}$ and $\{Y_{n_2}: n_2 \in N_2\}$, where $N_1$ and $N_2$ are time index sets. Then the cross-correntropy function 360 (FIG. 3) can be expressed as:

$$v_{x,y}(n_1, n_2) = E[k(x_{n_1}, y_{n_2})]$$

In the above equation, E is the expectation operator over the random processes, and k is a continuous positive definite kernel function. The correntropy function is a similarity measure between time series that induces the correntropy metric. Applying the Gaussian kernel, the cross-correntropy function takes the following form:

$$v_{x,y;\sigma}(n_1, n_2) = E[G_\sigma(\|x_{n_1} - y_{n_2}\|)]$$

In the above equation, $\sigma$ is the Gaussian bandwidth. Selection of the the kernel bandwidth may vary based on design considerations. In an example, the range $0.5 < \sigma < 1.5$ has been determined to worked well on a unit sphere with maximum geodesic distance of $\pi$.

For regime detection, trajectory segments of length N are considered, which are finite realizations of the random process. The expected value is replaced by the sample mean. The cross-correntropy between trajectory segments has the following range:

$$0 < v_{x,y;\sigma}(n_1, n_2) = E[G_\sigma(\|x_{n_1} - y_{n_2}\|)]$$

Consider the streaming time series at time n1. In the modified embedding space, the trajectory segment formed from the previous N points is:

$$\Delta \hat{x} = [\Delta \hat{x}^{(n_1)}, \Delta \hat{x}^{(n_1 - 1)}, \ldots, \Delta \hat{x}^{(n_1 - N + 1)}]$$

Similarly, the length N trajectory segment ending at time n2 in the training set is given by:

$$\Delta \hat{y} = [\Delta \hat{y}^{(n_2)}, \Delta \hat{y}^{(n_2 - 1)}, \ldots, \Delta \hat{y}^{(n_2 - N + 1)}]$$

The sample correntropy between these two trajectories is represented as follows:

$$\hat{v}(\Delta\hat{x}, \Delta\hat{y}) = \frac{1}{N}\sum_{i=0}^{N-1} G_\sigma\left(\|\Delta\hat{x}^{(n_1-i)} - \Delta\hat{y}^{(n_2-i)}\|\right)$$

In online streaming, the sample correntropy is determined for all length N trajectory segments in the training set 355 (FIG. 3). If a training segment $\Delta\hat{y}$ exists, such that $\hat{v}(\Delta\hat{x}, \Delta\hat{y})$ is about 1, then the current sample $x_{n1}$ is assigned to the desired regime 370 (FIG. 3). The processing can be repeated in real-time as streaming data arrives 380 (FIG. 3).

As noted above, the trajectories in the modified embedding space are on the surface of a sphere. Therefore, the Euclidian distance in the sample correntropy can be replaced with the geodesic length on the sphere to obtain a better depiction of the distance between points. All modified embedding space points are unit vectors, and thus the dot product between two points is the cosine of the angle therebetween. The geodesic length is therefore the arc cosine of the dot product, and can be represented as follows:

$$\hat{v}(\Delta\hat{x}, \Delta\hat{y}) = \frac{1}{N}\sum_{i=0}^{N-1} G_\sigma\left(\mathrm{acos}(\langle\Delta\hat{x}^{(n_1-i)}, \Delta\hat{y}^{(n_2-i)}\rangle)\right)$$

The method of regime detection discussed above and based on cross-correntropy in the scale and translation invariant modified embedding space can be described by Algorithm 1 as follows:

---

Algorithm 1 On-line regime detection in the modified embedding space with cross-correntropy

---

I. Embed training set y
Given a discrete time series $\{y_{n_2}: 1 \le n_2 \le L\}$
Select a time delay $\tau$, and embedding dimension m
for $i = (m-1)\tau + 1$ to L do
$\quad y^{(i)} = [y_i \cdot y_{i-\tau} \cdot \ldots \cdot y_{i-(m-1)\tau}]$
$\quad \Delta y^{(i)} = [y_i - y_{i-(m-1)\tau} \cdot \ldots \cdot y_{i-(m-2)\tau} - y_{i-(m-1)\tau}]$
$\quad \Delta \hat{y}^{(i)} = \frac{\Delta y^{(i)}}{\|\Delta y^{(i)}\|}$
end for
II. Regime detection of streaming data x at time $n_1$
Set desired trajectory length to N
Set Gaussian kernel bandwidth $\sigma$
Set threshold $\epsilon$ on cross-correntropy
$x^{(n_1)} = [x_{n_1} \cdot x_{n_1-\tau} \cdot \ldots \cdot x_{n_1-(m-1)\tau}]$
$\Delta x^{(n_1)} = [x_{n_1} - x_{n_1-(m-1)\tau} \cdot \ldots \cdot x_{n_1-(m-2)\tau} - x_{n_1-(m-1)\tau}]$
$\Delta \hat{x}^{(n_1)} = \frac{\Delta x^{(n_1)}}{\|\Delta x^{(n_1)}\|}$
for $j = (m-1)\tau + N$ to L do
$\quad p(j) = \frac{1}{N}\sum_{k=0}^{N-1} G_\sigma\left(\mathrm{acos}(\langle\Delta\hat{x}^{(n_1-k)} \cdot \Delta\hat{y}^{(j-k)}\rangle)\right)$
end for
if max p $> \epsilon$ then
$\quad$ Sample $x_{n_1}$ is in the desired regime
end if

---

For simplicity, only single regime detection is shown. Further training sets can be added to the embedding space for detection in multiple regimes, and incoming trajectory segments are compared with the training sets of all regimes. The regime that produces the highest correntropy is selected as the best fit.

Algorithm 1, described above, was tested using a single regime of quasi-periodic oscillations produced from a chaotic regime, commonly observed in the gas and oil industry. Performance was compared with a standard time delay embedding technique. The embedding parameters and detection procedures remained the same in each case. The segment length was chosen as N=10, and the kernel bandwidth was set to $\sigma$=0.9.

Figure 4:
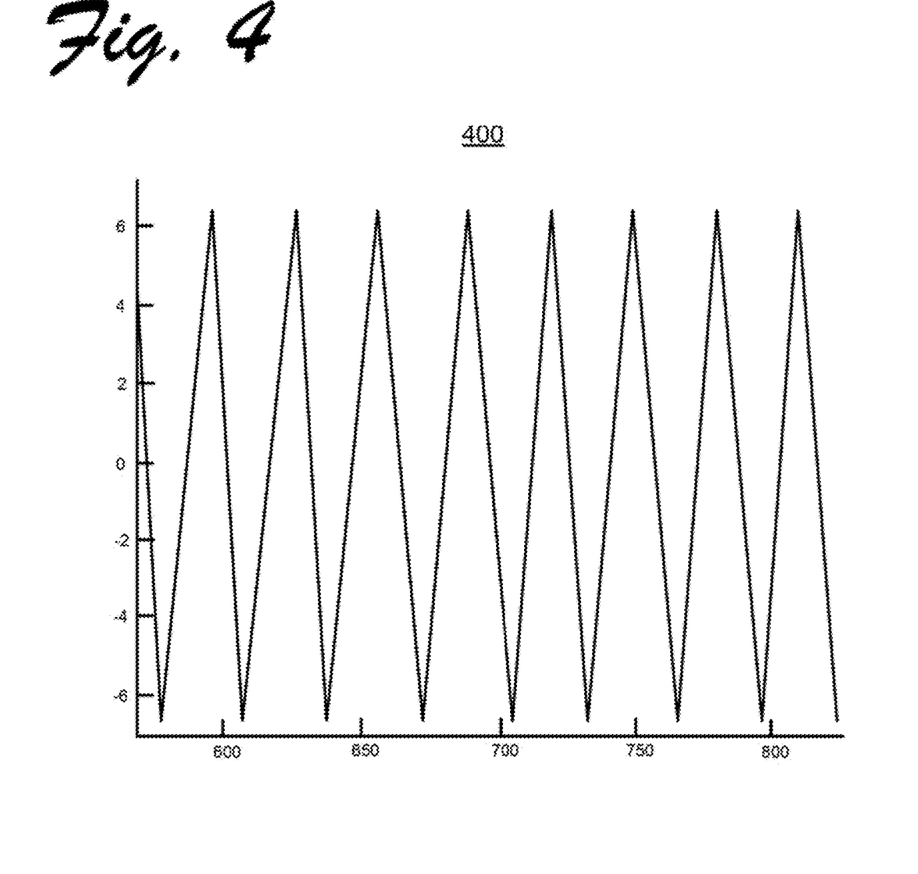
FIG. 4 is a plot showing an example training data set.

The Algorithm was implemented using an example training data set. FIG. 4 is a plot 400 showing the example training data set, using real data that has been mean-centered. The total training set length is 2500 samples. From the training set data, mutual information was used to select a time delay of 3 and applying the GrassbergerProcaccia technique revealed that the correlation dimension is 1.8. An embedding dimension of 4 successfully identified the attractor in this example. Results from a first test case are shown in FIG. 5a.

Figure 5A:
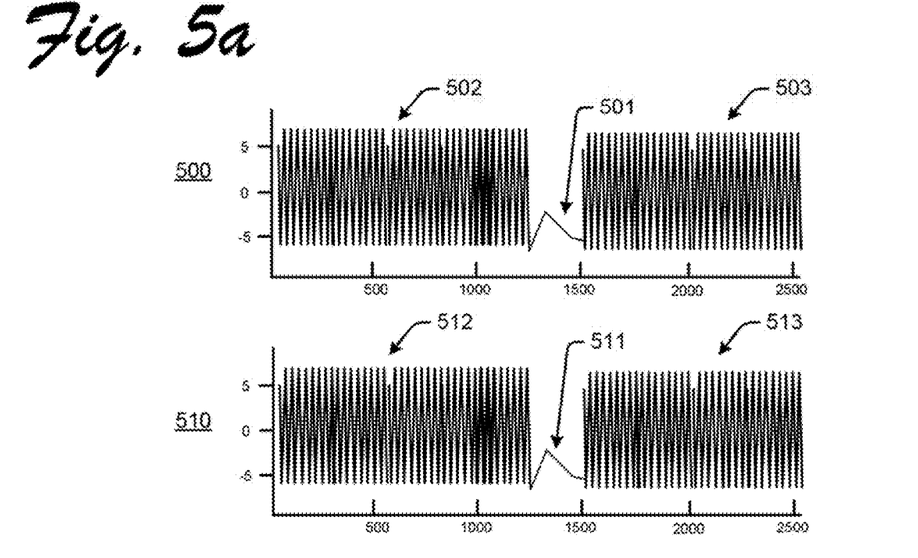
FIG. 5a are plots showing a first data set similar in mean and amplitude to the training set.

FIG. 5a are plots 500 and 510 showing a first data set similar in mean and amplitude to the training set (FIG. 4). In this test case, the test data was similar in mean and amplitude to the training set. Two oscillatory segments are shown with a non-oscillatory middle segment. It can be seen that the modified embedding technique implemented by Algorithm 1 (plot 500) and the standard embedding technique (plot 510) both performed about the same for this data set. That is, both techniques detected oscillations at 502, 512 and at 503, 513, and the non-oscillatory middle segments 501, 511 went undetected.

It is noted that the standard embedding technique (plot 510) worked in this case because the training set (FIG. 4) and the test data were similar in mean and scale. But when the test set was scaled, and sections of the test set were translated, as shown in FIG. 5b, the standard embedding technique did not perform as well as the modified embedding technique implemented by Algorithm 1.

Figure 5B:
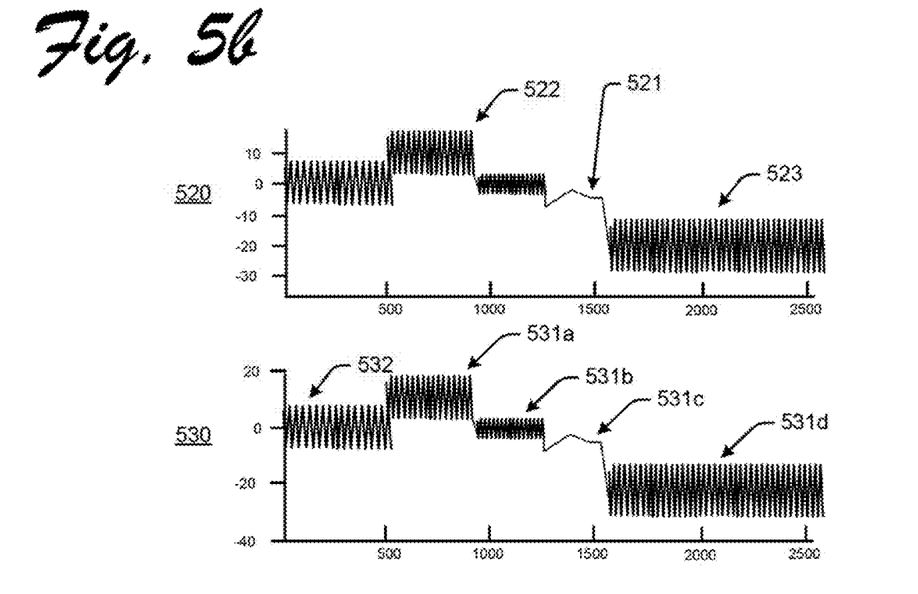
FIG. 5b are plots showing a second data set including scaled and translated versions of the oscillation.

FIG. 5b are plots 520 and 530 showing a second data set including scaled and translated versions of the oscillation. In this test, the modified embedding technique implemented by Algorithm 1 (plot 520) outperformed the standard embedding technique (plot 530). That is, the modified embedding technique implemented by Algorithm 1 detected oscillatory regimes at 522 and 523. But the standard embedding technique only detected oscillatory data at 532. The standard embedding technique was not able to detect data oscillatory data at 531a, 531b, 531c, or at 531d.

Figure 6:
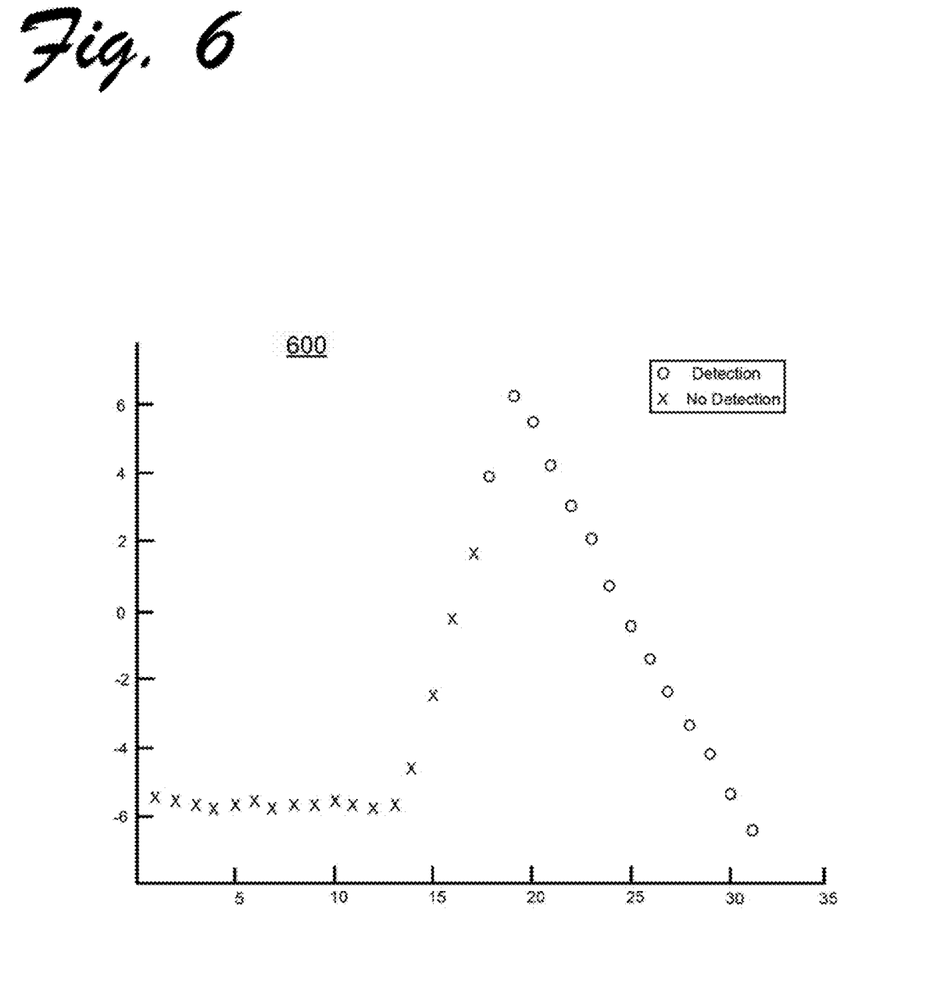
FIG. 6 is a plot showing immediate detection following onset of oscillation.

Accordingly, Algorithm 1 is able to detect changes in regime quickly, even before periodicity is otherwise evident. The reaction time can be characterized as the number of missed detections following the onset of a regime. FIG. 6 is a plot 600 showing detection (o) using Algorithm 1 following onset of an oscillation regime. It can be seen that detection occurs in this example after just four data points (x) in the oscillation. The techniques described above and implemented in an example by Algorithm 1 can also be used to detect oscillations by identifying a strong spectral component at the fundamental frequency.

It is also noted that in an online setting, at least one period of the oscillations must elapse to have meaning in the frequency domain, which is too much delay in some applications. But using the techniques described herein, the segment length (N) provides the user with control over the reaction time. The reaction time is determined from the transition to the second oscillatory regime. The tradeoff between reaction time and error rate can be seen in Table 1.

TABLE 1

| Length N | Reaction Time | Error Rate |
|---|---|---|
| 2 | 5 | 3.7% |
| 4 | 8 | 2.5% |
| 6 | 17 | 2.1% |
| 8 | 17 | 1.7% |
| 10 | 21 | 1.9% |

It can be seen in Table 1, that for the N values tested, all reaction times were less than the average oscillation period of about 30 samples.

Before continuing, it should be noted that the examples described above are provided for purposes of illustration, and are not intended to be limiting. Other devices and/or device configurations may be utilized to carry out the operations described herein.

Figure 7:
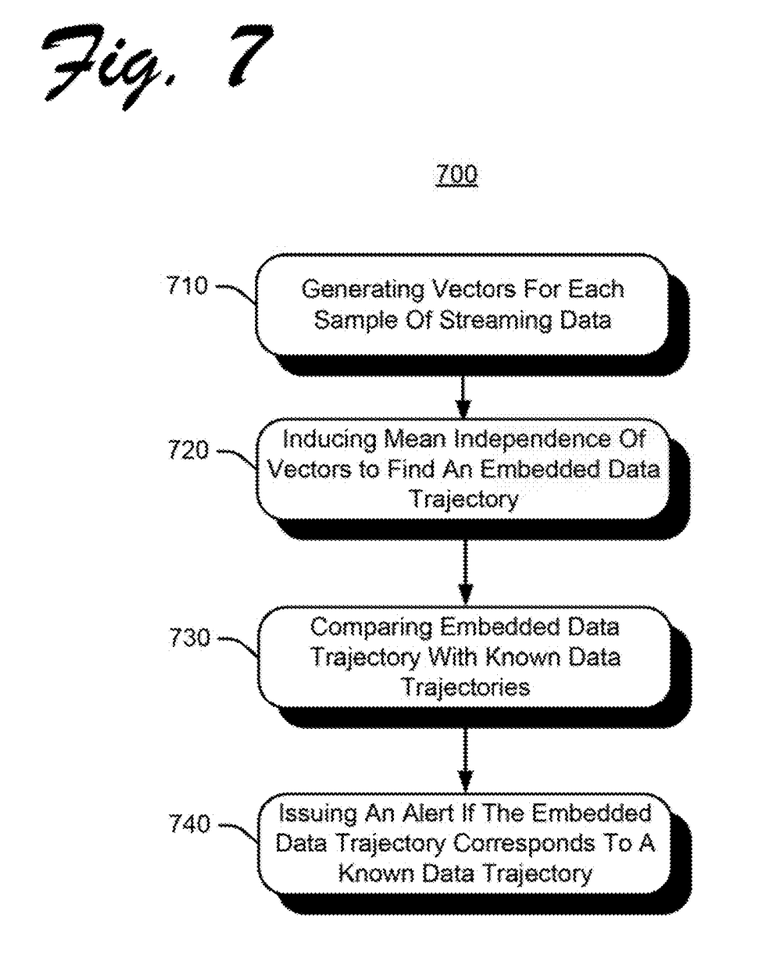
FIG. 7 is a flowchart illustrating example operations which may be implemented multi-regime detection in streaming data.

FIG. 7 is a flowchart illustrating example operations which may be implemented for multi-regime detection in streaming data. Operations 700 may be embodied as logic instructions on one or more computer-readable medium. When executed on a processor, the logic instructions cause a general purpose computing device to be programmed as a special-purpose machine that implements the described operations. In an example, the components and connections depicted in the figures may be used.

Operation 710 includes generating vectors for each sample of the streaming data. Operation 720 includes inducing mean independence of the vectors to find an embedded data trajectory. Operation 730 includes comparing the embedded data trajectory with known data trajectories. Operation 740 includes issuing an alert if the embedded data trajectory corresponds to a known data trajectory indicating an anomaly in the streaming data.

In an example, the known data trajectories represent different regimes of interest. Each regime may have an associated embedded training set. The known data trajectories may be generated using training data.

In another example, comparing the embedded data trajectory with known data trajectories is by evaluating cross-correntropy between arguments. The regime with the largest cross-correntropy between the embedded data trajectory and the known data trajectories may be selected as the best fit.

The operations shown and described herein are provided to illustrate example implementations. It is noted that the operations are not limited to the ordering shown. Still other operations may also be implemented.

Further operations may include creating the embedded data trajectory with elements that are linear combinations of time delayed samples, and subtracting a last vector element from other vector elements to induce mean independence of the vectors.

Still further operations may include determining embedding parameters, converting time delay embedding into difference patterns, and normalizing the difference patterns.

The operations may be implemented at least in part using an end-user interface (e.g., web-based interface). In an example, the end-user is able to make predetermined selections, and the operations described above are implemented on a back-end device to present results to a user. The user can then make further selections. It is also noted that various of the operations described herein may be automated or partially automated.

It is noted that the examples shown and described are provided for purposes of illustration and are not intended to be limiting. Still other examples are also contemplated.

The invention claimed is:

1. A method stored as program code stored on a non-transient computer-readable medium and executable by a processor for multi-regime detection in streaming data, the method when executed by a processor comprising:
    generating vectors for each sample of the streaming data;
    inducing mean independence of the vectors to find an embedded data trajectory;
    comparing the embedded data trajectory with known data trajectories; and
    issuing an alert if the embedded data trajectory corresponds to a known data trajectory indicating an anomaly in the streaming data so that corrective action can be taken before the anomaly leads to a disruption.

2. The method of claim 1, further comprising creating the embedded data trajectory with elements that are linear combinations of time delayed samples.

3. The method of claim 1, further comprising subtracting a last vector element from other vector elements to induce mean independence of the vectors.

4. The method of claim 1, wherein the known data trajectories represent different regimes of interest.

5. The method of claim 4, wherein each regime has an associated embedded training set.

6. The method of claim 1, wherein comparing the embedded data trajectory with known data trajectories is by evaluating cross-correntropy between arguments to understand similarity between multiple segments.

7. The method of claim 1, wherein the regime with the largest cross-correntropy between the embedded data trajectory and the known data trajectories is selected as a best fit.

8. The method of claim 1, further comprising generating the known data trajectories based on training data.

9. The method of claim 1, further comprising determining embedding parameters.

10. The method of claim 1, further comprising converting time delay embedding into difference patterns.

11. The method of claim 1, further comprising normalizing the difference patterns.

12. A system for multi-regime detection in streaming data, the system including program code stored on non-transient computer-readable media and executable by a processor to:
    generate vectors for each sample of multi-dimensional streaming data;
    induce mean independence of the vectors and find an embedded data trajectory;
    compare the embedded data trajectory with known data trajectories; and
    issue an alert if the embedded data trajectory corresponds to a known data trajectory indicating an anomaly in the streaming data.

13. The system of claim 12, wherein the program is further executable to create the embedded data trajectory with elements that are linear combinations of time delayed samples.

14. The system of claim 12, wherein the program is further executable to compare the embedded data trajectory with known data trajectories by evaluating cross-correntropy between arguments.

15. The system of claim 12, wherein the regime with the largest cross-correntropy between the embedded data trajectory and the known data trajectories is selected as a best fit.

16. The system of claim 12, wherein the program is further executable to generate the known data trajectories based on training data.

17. The system of claim 12, wherein the program is further executable to determine embedding parameters.

18. The system of claim 12, wherein the streaming data is from a non-stationary monitoring environment.

19. The system of claim 12, wherein analysis of the streaming data detects anomalies online with short reaction time relative to frequency domain methods.

20. The system of claim 12, wherein analysis of the streaming data is invariant to constant scaling and translation.

* * * * *

UNITED STATES PATENT AND TRADEMARK OFFICE
CERTIFICATE OF CORRECTION

PATENT NO. : 8,620,987 B2  
APPLICATION NO. : 13/229710  
DATED : December 31, 2013  
INVENTOR(S) : Lakshminarayan et al.

Page 1 of 1

It is certified that error appears in the above-identified patent and that said Letters Patent is hereby corrected as shown below:

In the Claim

Column 10, line 37, Claim 10, delete "1,further" and insert -- 1, further --, therefor.

Signed and Sealed this  
Sixth Day of May, 2014

Michelle K. Lee  
*Deputy Director of the United States Patent and Trademark Office*